(12) United States Patent
Wan et al.

(10) Patent No.: US 8,983,445 B2
(45) Date of Patent: Mar. 17, 2015

(54) SMART DATA CONNECTIONS FOR MOBILE DEVICES

(75) Inventors: Chieh-Yih Wan, Beaverton, OR (US); Rahul C. Shah, San Francisco, CA (US); Junaith Ahemed Shahabdeen, San Jose, CA (US); Lama Nachman, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 13 days.

(21) Appl. No.: 13/996,269

(22) PCT Filed: Dec. 30, 2011

(86) PCT No.: PCT/US2011/068058
§ 371 (c)(1),
(2), (4) Date: Jun. 20, 2013

(87) PCT Pub. No.: WO2013/101170
PCT Pub. Date: Jul. 4, 2013

(65) Prior Publication Data
US 2013/0316739 A1    Nov. 28, 2013

(51) Int. Cl.
| | |
|---|---|
| *H04M 3/00* | (2006.01) |
| *H04W 52/02* | (2009.01) |
| *G01S 19/34* | (2010.01) |
| *H04M 1/725* | (2006.01) |
| *H04W 48/18* | (2009.01) |
| *H04W 64/00* | (2009.01) |
| *H04W 88/06* | (2009.01) |

(52) U.S. Cl.
CPC ........... *H04W 52/0274* (2013.01); *G01S 19/34* (2013.01); *H04M 1/72569* (2013.01); *H04W 48/18* (2013.01); *H04W 64/00* (2013.01); *H04M 2250/12* (2013.01); *H04W 88/06* (2013.01)
USPC .................... 455/418; 455/550.1; 455/552.1; 455/456.4; 370/352

(58) Field of Classification Search
CPC . H04W 8/245; H04W 88/06; H04M 1/72519; H04L 29/06027
USPC .................... 455/418, 550.1, 552.1; 370/352
See application file for complete search history.

(56) References Cited

U.S. PATENT DOCUMENTS

| | | | |
|---|---|---|---|
| 6,067,460 A | 5/2000 | Alanara et al. | |
| 2003/0081657 A1* | 5/2003 | Ranta | 375/147 |
| 2011/0009727 A1* | 1/2011 | Mensinger et al. | 600/365 |
| 2011/0294520 A1* | 12/2011 | Zhou et al. | 455/456.1 |
| 2012/0185419 A1* | 7/2012 | Kuhn et al. | 706/12 |

OTHER PUBLICATIONS

"PCT Notification of Transmittal of the International Search Report and the Written Opinion of the International Searching Authority, or the Declaration", dated Sep. 24, for International Application No. PCT/US2011/068058, 10pgs.
"Notification Concerning Transmittal of International Preliminary Report on Patentability Chapter 1 of the Patent Cooperation Treaty", Jul. 10, 2014, for International Application No. PCT/US2011/068058, 7pgs.

* cited by examiner

*Primary Examiner* — Danh Le
(74) *Attorney, Agent, or Firm* — Buckley, Maschoff & Talawalkar LLC

(57) ABSTRACT

A method may include detecting motion of a mobile device and inferring from the motion a first activity of a user of the mobile device. The method may also include evaluating a signal quality of a radio signal received by a signal module and altering an operational mode of the signal module based on the signal quality and the first activity.

24 Claims, 7 Drawing Sheets

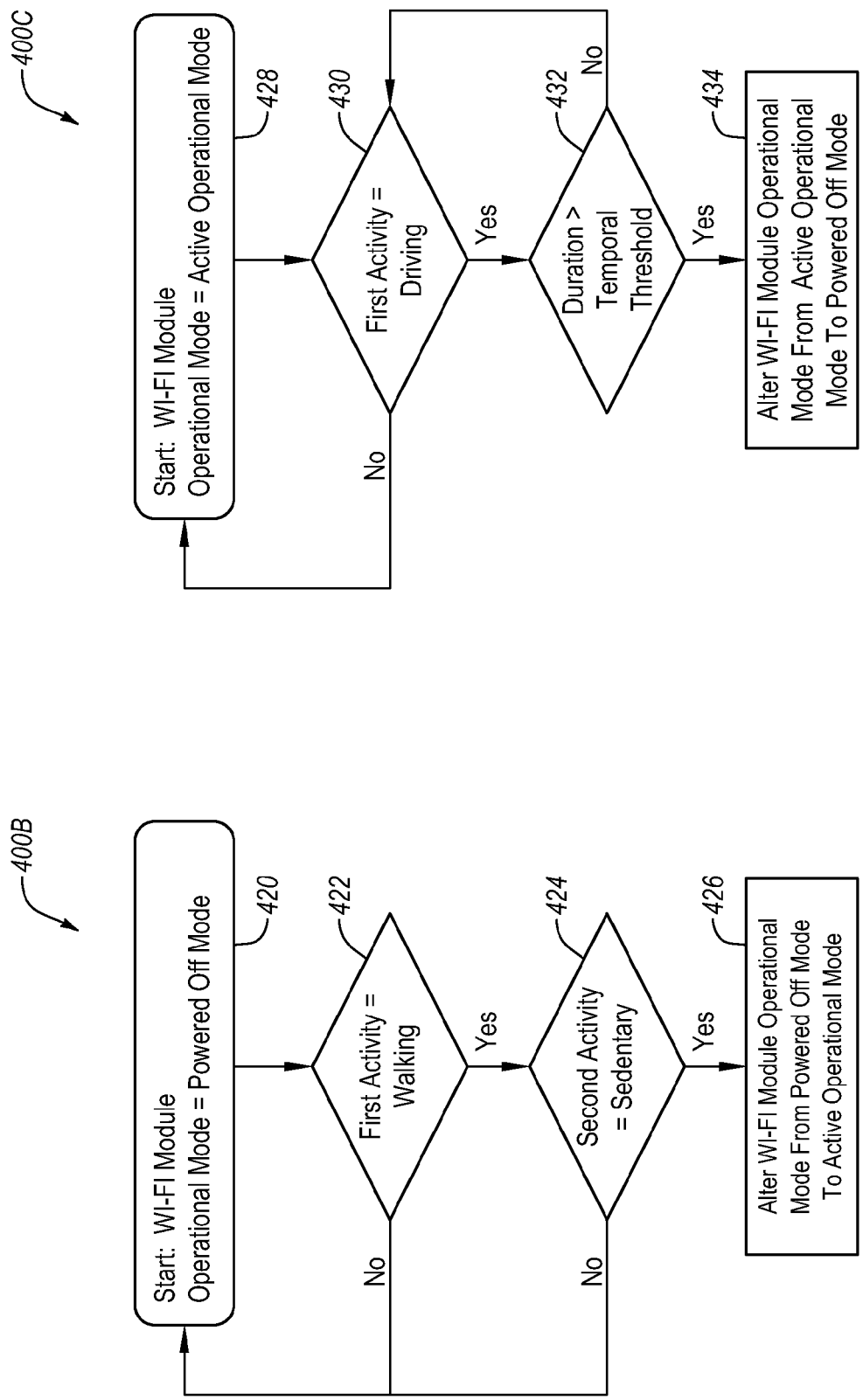

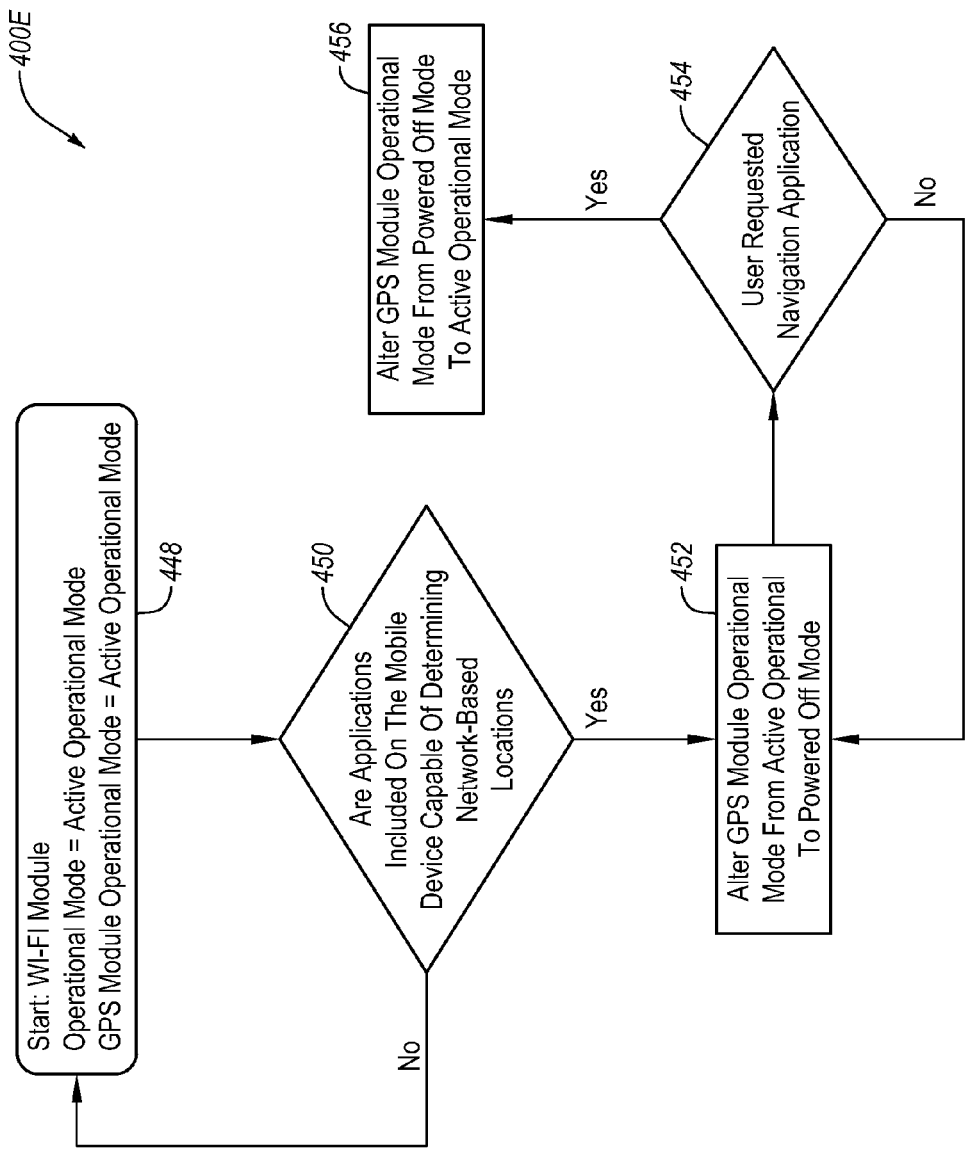

SMART DATA CONNECTIONS FOR MOBILE DEVICES

BACKGROUND OF THE INVENTION

Power consumption is becoming a more important criterion in the design of mobile devices. An area that may consume power in mobile devices is radio signal processing for receiving global positioning system ("GPS") data and wireless network ("Wi-Fi") data. In some instances, the radio signal processing for receiving GPS and Wi-Fi data consumes power even when a mobile device has no GPS or Wi-Fi signal reception. During periods without GPS or Wi-Fi signal reception, a GPS module and/or a Wi-Fi module included in the mobile device may continue to search for GPS or Wi-Fi signals. The searching may occur when a user of the mobile device is not using GPS or Wi-Fi signals.

A conventional technique to reduce power consumption in mobile devices is to power off the GPS module and the Wi-Fi modules via static settings. In this technique, when a screen of the mobile device is powered off, the GPS module and Wi-Fi module are also powered off. However, this technique breaks the "always-connected" metaphor and may disrupt the operation of applications and services on the mobile device. Additionally, this technique may require manual input by a user of the mobile device to reactivate the GPS module and/or Wi-Fi module, making this technique cumbersome for the user of the mobile device.

BRIEF DESCRIPTION OF THE DRAWINGS

FIG. 4B is a flow chart of another example method, according to some embodiments.

FIG. 4C is a flow chart of another example method, according to some embodiments.

FIG. 4E is a flow chart of another example method, according to some embodiments.

DETAILED DESCRIPTION OF EXAMPLE EMBODIMENTS

Figure 1:
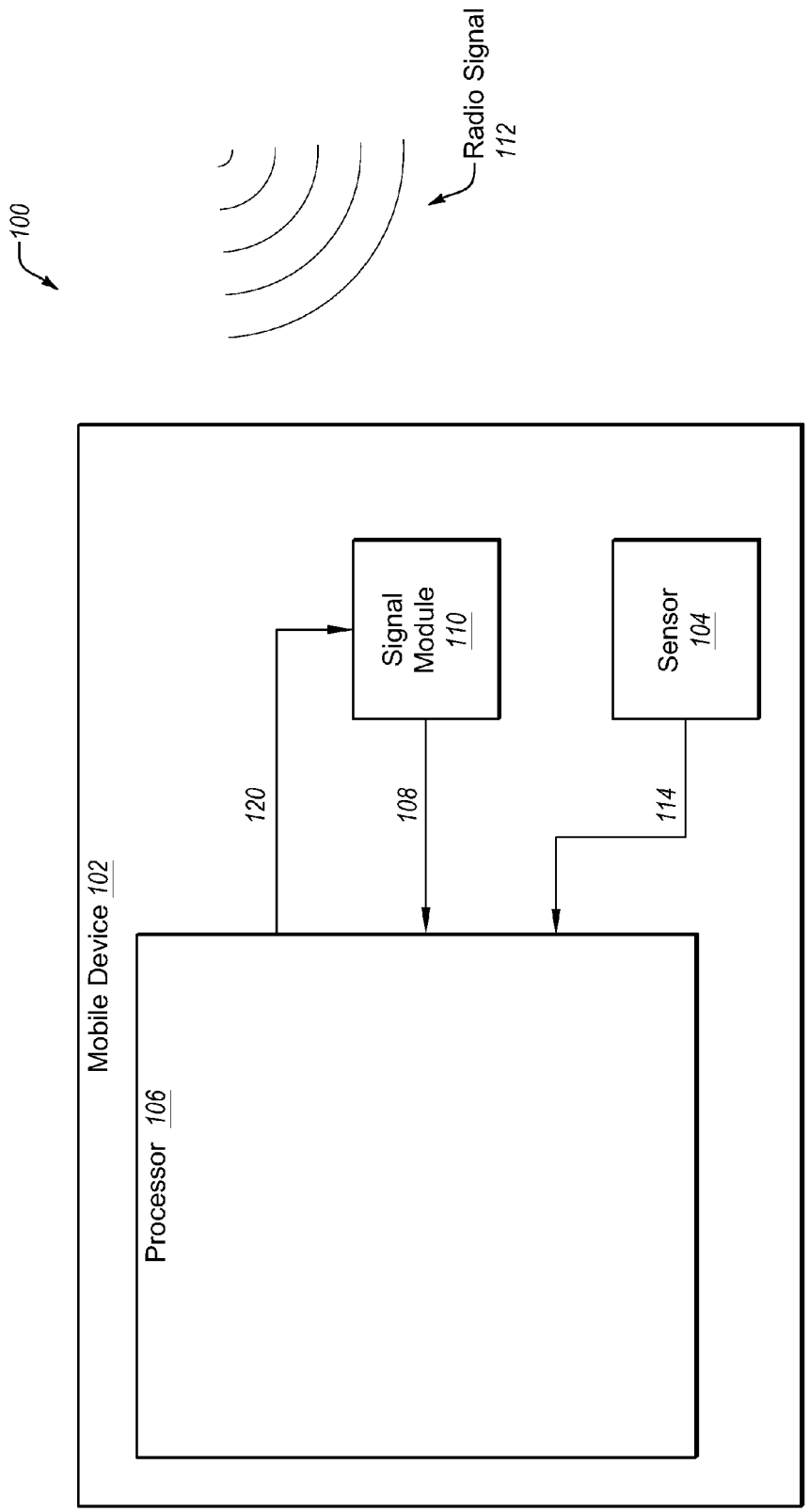
FIG. 1 is a block diagram of an example system, according to some embodiments.

FIG. 1 is a block diagram of an example system 100, according to some embodiments.

The system 100 may include a mobile device 102 that may be associated with and/or operated by a user. The example mobile device 102 also includes, for example, a processor 106 that is operably interfaced with a signal module 110 and a sensor 104, described in further detail below. The user may carry or otherwise include the mobile device 102 in one or more physical actions performed by the user. For example, the user may carry the mobile device 102 while walking, running, hiking, biking, and/or driving a vehicle. Similarly, the user may include the mobile device 102 while the user is sleeping, napping, sitting on the couch, for instance.

In some embodiments, the mobile device 102 may be configured to detect physical actions performed by the user. Based on the physical actions performed by the user, the mobile device 102 may reduce its power consumption by altering an operational mode of a signal module 110 within the mobile device 102. For example, the mobile device 102 may detect the user is sleeping and alter an operational mode of the signal module 110 to a low power mode thereby reducing the power consumption of the mobile device 102.

In some embodiments, the signal module 110 may be configured to receive a radio signal 112. The radio signal 112 may include various data and/or signals propagated or transmitted to the mobile device 102. The radio signal 112 may include a global positioning system ("GPS") signal or a wireless network ("Wi-Fi") signal, for instance.

In some embodiments, the signal module 110 may include one or more operational modes. The operational modes refer to one or more sets of functions performed by the signal module 110 with respect to the radio signal 112. For example, in some embodiments, the signal module 110 may include an active operational mode in which the signal module 110 may continuously receive and/or search for the radio signal 112. Additionally or alternatively, the signal module 110 may include one or more low power modes in which the signal module 110 ceases continuous reception of and/or searching for the radio signal 112 and/or a powered off mode in which the mobile device 102 ceases to direct power to the signal module 110. The above listed operational modes represent only a subset of possible operational modes. In some embodiments, the signal module 110 may communicate data included in and/or related to the radio signal 112 to the processor 106.

The sensor 104 in FIG. 1 is depicted as being incorporated into the mobile device 102. The sensor 104 may be permanently or temporarily fixed and/or installed in the mobile device 102. However, in some embodiments the sensor 104 may be selectively and/or optionally coupled to the mobile device 102 as through a Universal Serial Bus ("USB"), a Bluetooth link, an earphone jack, or a 30-pin dock connector, for instance. Additionally or alternatively, the sensor 104 may be incorporated in another mobile device or may be incorporated in a peripheral, ancillary, and/or related device. For example, a sensor 104 may be embedded in a wearable device such as a wristwatch and/or an earpiece.

The sensor 104 may include one or more conventional/real sensors, which may include, but are not limited to, an accelerometer, a gyroscope, a camera, a light sensor, an infrared detector, a motion sensor, a barometer, and/or a compass. Additionally, the sensor 104 may include one or more soft sensors. In embodiments in which the sensor 104 includes a soft sensor, the sensor 104 may produce soft sensor data. Generally, soft sensors data may result from the processing or combination of one or more measured quantities and/or information to derive new quantities that need not be measured. One example of a soft sensor might include navigation software.

The sensor 104 may be configured to detect motion, to generate motion data representative of the detected motion, and/or produce soft sensor data (collectively "sensed information"). In some embodiments, the motion may result from the physical action performed by a user of the mobile device 102. For example, the physical action performed by a user may include sleeping, which may result in relatively stable or no motion detected by the sensor 104. In some embodiments, the sensor 104 may communicate the motion data to the processor 106.

The processor 106 may generally include any machine or mechanism capable of transforming or otherwise combining, modifying, and/or changing one or more inputs. An example processor 106 may be implemented, at least partially, in hardware, programmable devices, software, or some combination thereof. The processor 106 may receive the motion data from the sensor 104 and data included in and/or related to the radio signal 112 from the signal module 110 by way of communication couplings 114 and 108 respectively. In some embodiments, the processor 106 may receive the motion data and the radio signal 112 continuously, in real time, and/or periodically, for example. The processor 106 may infer an activity from the motion data and may evaluate a characteristic of the radio signal 112, such as signal quality. The processor 106 may use a set or series of patterns, templates, and/or programs to analyze the motion data to infer the activity.

Based on the evaluated signal quality and the inferred activity, the processor 106 may alter the operational mode of the signal module 110. For example, the processor 106 may communicate a command to alter the operational mode of the signal module 110 by way of a communication coupling 120.

In the depicted embodiment, the mobile device 102 includes one signal module 110 that receives one type of radio signal 112, one processor 106, and one sensor 104 that detects one type of motion of a user. However, this depiction is for diagrammatic convenience and not meant to limit potential embodiments. Specifically, the mobile device 102 may include any number of signal modules 110 that may receive in combination or individually any number of types of radio signals 112. Additionally or alternatively, the mobile device 102 may have multiple processors 106 communicatively coupled and/or performing any subset of the herein-described acts. Similarly, the mobile device 102 may include any number of sensors 104 that accordingly may detect in combination or individually any number of different types of motion of a user. Further, the processor 106 and the signal module 110 may be combined into a single module. In some embodiments, the mobile device 102 may be, but is not limited to, a cellular telephone, a smart telephone, a handheld computer, a personal digital assistant, a tablet computer, a laptop computer, a handheld gaming device, a portable media player, a pager, a personal navigation device, a camera, and/or a timepiece.

Figure 2:
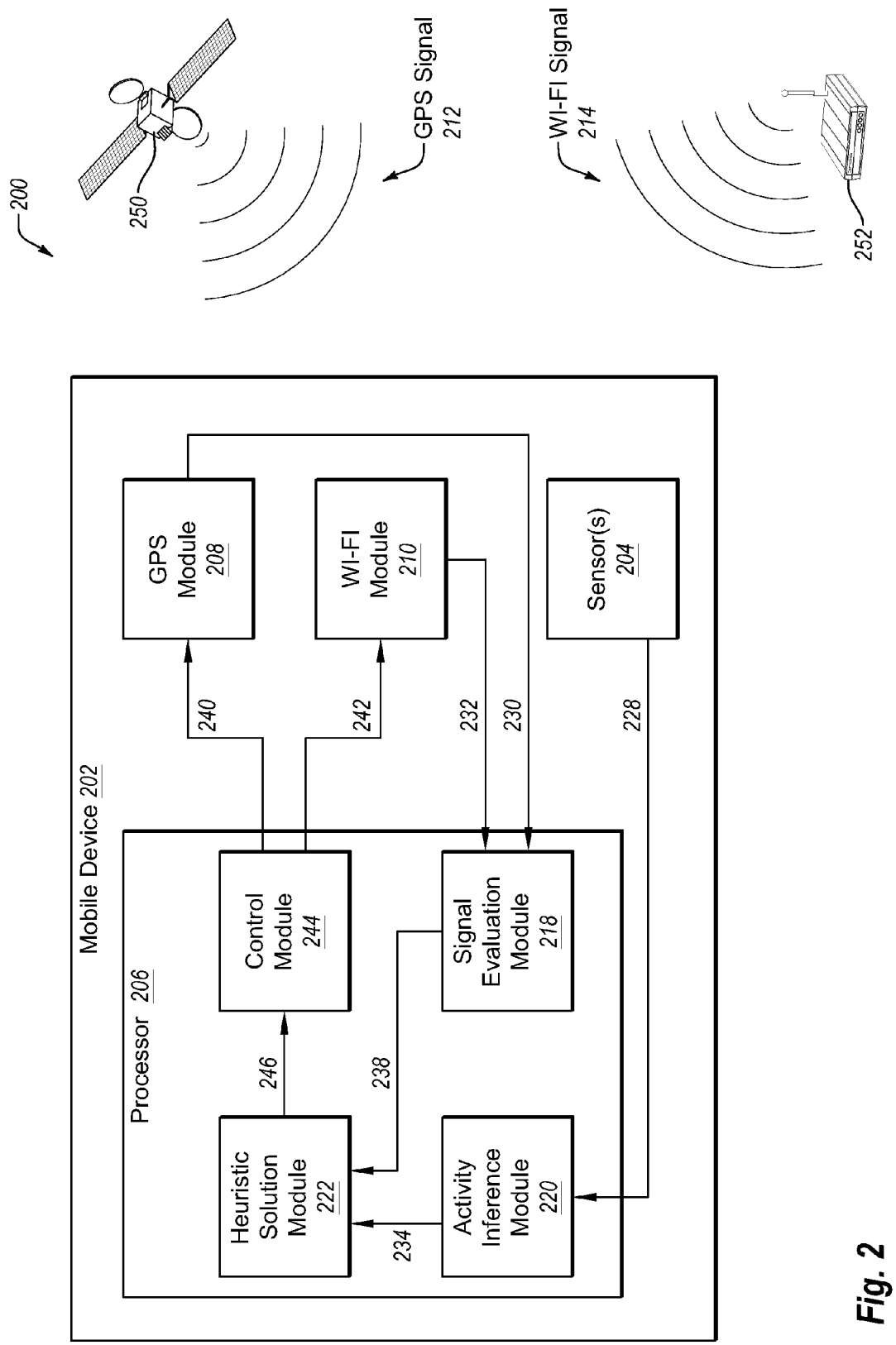
FIG. 2 is a block diagram of an example system, according to some embodiments.

FIG. 2 is a block diagram of an example system 200, according to some embodiments. The system 200 may include a mobile device 202 that may include a processor 206. The mobile device 202 may also include applications and/or programs that utilize data included in and/or related to global positioning system ("GPS") radio signals ("GPS signals") 212 and/or wireless network ("Wi-Fi") radio signals ("Wi-Fi signals") 214.

Based on motion detected by the mobile device 202 that results from one or more physical actions performed by a user of the mobile device 202, the mobile device 202 may alter an operational mode of a GPS module 208 and/or a Wi-Fi module 210 receiving the respective GPS signals 212 and Wi-Fi signals 214. To determine whether and/or when to alter an operational mode of the GPS module 208 and/or the Wi-Fi module 210, the mobile device 202, in some embodiments, may perform three general actions. First, the processor 206 may be configured to evaluate a Wi-Fi signal quality and/or a GPS signal quality from the Wi-Fi signals 214 and the GPS signals 212, respectively. Second, in some embodiments, the processor 206 may be further configured to infer an activity indicative of the motion detected by a sensor 204 within the mobile device 202. Third, the processor 206 may apply rule-based heuristics to the Wi-Fi signal quality and/or the GPS signal quality along with the inferred activity to determine whether and/or when to alter the operational modes of the GPS module 208 and/or the Wi-Fi module 210. In some embodiments, the activity may be inferred before the signal quality is determined and/or the activity may be inferred simultaneously as the evaluation of the signal quality. Each of the three general actions is explained in further detail below.

The GPS signals 212 may be received by the GPS module 208. The GPS module 208 may include a GPS receiver and/or software that may calculate and/or extract position and/or time from the GPS signals 212. Generally, the GPS signals 212 are transmitted by a constellation of GPS satellites 250 orbiting Earth. Each GPS satellite 250 in the constellation continually broadcasts GPS signals 212 having a defined format including GPS satellite-specific ranging codes and a navigation message. The civilian format of the GPS signals 212 is briefly described herein, however this is not meant to limit potential embodiments.

The ranging code allows the GPS module 208 to identify which GPS satellite 250 in the constellation is broadcasting the GPS signals 212. The navigation contains a time; an ephemeris, which includes precise orbital information of the GPS satellite 250 transmitting the GPS signals 212; and an almanac, which contains the coarse orbital information for all the GPS satellites 250 and the relative health of the constellation.

For use in navigation, the GPS module 208 may receive GPS signals 212 from 3 or more GPS satellites 250 and triangulate from the GPS signals 212 a position of the GPS module 208. In some embodiments, the GPS module 208 may include a capability to search for GPS satellites 250. Because the GPS signals 212 previously received by the GPS module 208 may become stale after periods of nonuse, the GPS module 208 may search for GPS satellites 250 prior to and/or between receiving GPS signals 212. In some embodiments, searching for GPS satellites 250, the reception of GPS signals 212, and the navigation processes performed by the GPS module 208 may use power.

Evaluation of data included in and/or related to received GPS signals 212 may indicate a signal quality of the GPS signals 212 (the "GPS signal quality"). The GPS signal quality may, for instance, depend on the availability of GPS satellites 250. For example, using the ranging code, the GPS signals 212 may indicate the number of GPS satellites 250 transmitting the GPS signals 212 and received by the GPS module 208. In some embodiments, the GPS signal quality may include a single or no GPS satellites 250 transmitting GPS signals 212 that are received by the GPS module 208.

The Wi-Fi signals 214 may be transmitted by one or more access points (individually an "AP"; pluralized "APs") 252. The Wi-Fi module 210 may connect to a network, for example the internet and/or a corporate LAN, by way of the AP 252. That is, the Wi-Fi module 210 may receive the Wi-Fi signals 214 from the network via the AP 252 and/or transmit data via the AP 252 to the network.

Each AP 252 has a transmission range within which a network connection between the Wi-Fi module 210 and the network may be maintained. For example, in some embodiments, the AP 252 may have a transmission range of a radius of approximately 100 meters. The transmission range may vary based on various factors such as location, being indoors or outdoors, mounting elevation of the AP 252, nearby obstructions such as buildings, electrical interference from other devices, presence of other APs, the capability of the Wi-Fi module 210, weather, and/or jurisdictional frequency limitations. The transmission range of APs 252, in some circumstances, may or may not overlap, thereby producing areas of high or strong Wi-Fi signals 214 and areas with weak or no Wi-Fi signals 214. For example, rural areas may have weak or no Wi-Fi signals 214 because of a lack of APs 252, while a city may have weak or no Wi-Fi signals 214 due to interference caused by buildings.

In some embodiments, the Wi-Fi module 210 may include a capability to search for the APs 252. For example, the Wi-Fi module 210 may search for APs 252 in areas with weak or no Wi-Fi signals 214 and/or when the Wi-Fi signals 214 are lost. In some embodiments, searching for the APs 252 and/or the reception of Wi-Fi signals 214 may use power.

Evaluation of data included in and/or related to received Wi-Fi signals 214 may indicate a signal quality of the Wi-Fi signals 214 ("Wi-Fi signal quality"). The Wi-Fi signal quality may depend on the availability of APs 252. An example of Wi-Fi signal qualities may include the absence of received Wi-Fi signals 214, which may result from no available APs 252.

The Wi-Fi module 210 and/or the GPS module 208 may include various operational modes. The operational modes generally include a set of functions performed by the Wi-Fi module 210 and/or the GPS module 208 with respect to the Wi-Fi signals 214 and/or the GPS signals 212.

For example, the GPS module 208 may include an active operational mode, also referred to as "full on," in which the GPS module 208 may continuously receive and/or search for the GPS signals 212, calculate a position of the GPS module 208, and/or communicate data included in and/or related to the GPS signals 212. Additionally or alternatively, the GPS module 208 may include an operational mode referred to as "trickle mode" in which the GPS module 208 surveys availability of GPS satellites 250. In the trickle mode, the GPS signals 212 may be limited to the number of GPS satellites 250 detected by the GPS module 208. Additionally or alternatively, the GPS module 208 may include a powered off mode in which the mobile device 202 ceases to direct power to the GPS module 208.

Additionally or alternatively, the Wi-Fi module 210 may include operational mode(s) similar or equivalent to the active operational mode, the trickle mode, and/or the powered off mode as described with respect to the GPS module 208.

In the example embodiment depicted in FIG. 2, the GPS module 208 is separate from the Wi-Fi module 210. In some embodiments, the GPS module 208 and the Wi-Fi module 210 may share components, mechanisms, circuitry, and/or functional capabilities, for instance.

In some embodiments, the mobile device 202 may include a signal evaluation module 218. The signal evaluation module 218 may be configured to receive data included in and/or related to the GPS signals 212 or some portion thereof from the GPS module 208 and/or data included in and/or related to the Wi-Fi signals 214 or some portion thereof from the Wi-Fi module 210 as depicted in FIG. 2 by the communication couplings 230 and 232. The signal evaluation module 218 may evaluate the GPS signal quality and/or the Wi-Fi signal quality as described herein. The GPS signal quality may, for example, relate to the number of GPS satellites 250 transmitting GPS signals 212 received by the GPS module 208 and/or the intensity of the GPS signals 212. Likewise, the Wi-Fi signal quality may, for example, relate to the number of APs 252 transmitting Wi-Fi signals 214 received by the Wi-Fi module 210 and/or the intensity of the Wi-Fi signals 214.

As described above, the Wi-Fi signal quality and/or the GPS signal quality may vary as the user of the mobile device 202 moves from one area to another area. For example, the walls of the building may interfere with GPS signals 212, but the building may have a local AP 252. In these and other embodiments, the GPS signal quality may be low and the Wi-Fi signal quality may be high. Alternatively, if the mobile device 202 where in a rural area, buildings may not block the GPS signals 212 and there may not be a local APs 252 available. In these and other embodiments, the GPS signal quality may be high while the Wi-Fi signal quality may be low.

Motion may be produced as the mobile device 202 is included in one or more physical actions performed by a user. Physical actions performed by a user refers to any set of actions such as running, walking, sitting, for example, that may produce motion that may be detected by the sensor 204. Accordingly, the motion may include changes or lack thereof in the static, inertial, or dynamic conditions of the mobile device 202 resulting from the physical action performed by a user. For example, in some embodiments, the mobile device 202 may be a smart phone and a physical action performed by a user may be running. Because running includes a particular set of motion such as periodic elevation changes, a forward velocity, and/or a cadence, the mobile device 202 will be subject to the motion particular to running when the user carries the smart phone while running.

In some embodiments, the mobile device 202 may include the sensor 204 that may detect the motion. The sensor 204 may generate motion data from the detected motion. Examples of the sensor 204 may include, but are not limited to, an accelerometer, a gyroscope, a camera, a light sensor, an infrared detector, a motion sensor, a barometer, and/or a compass. In some embodiments, the sensor 204 may be selectively and/or optionally coupled to the mobile device 202 as through a USB, a Bluetooth link, an earphone jack, or a 30-pin dock connector, for instance.

In some embodiments, the mobile device 202 may include multiple sensors 204 that independently and/or in combination detect motion of the mobile device 202. That is, a first sensor 204 may detect a first motion while a second sensor 204 may detect a second motion. Alternatively, the first sensor 204 may independently detect the first motion and in combination with the second sensor 204 detect the second motion.

In some embodiments, the sensor 204 detects the motion and/or generates motion data as a function of time resulting in time-series data. The sampling frequencies of the time-series data may be controlled by the processor 206, and/or controlled by another processor, for instance.

In some embodiments, the sensor 204 may communicate the motion data to the processor 206 as depicted by communication coupling 228. The communication between the sensor 204 and the processor 206 may be continuous, in real time, or periodic.

In some embodiments, the processor 206 may include an activity inference module 220. The activity inference module 220 may be configured to receive motion data or some subset of data generated by the sensor 204. From the motion data, the activity inference module 220 may infer an activity that may indicate the physical action performed by a user. For example, the activity inference module 220 may include a set or series of patterns, templates, and/or programs that may analyze the motion data generated by the sensor 204 and infer from the motion data the activity of a user. The activity inferred by the activity inference module 220 may be a particular activity and/or may be a general category that includes a set of physical actions performed by a user.

For example, the physical action performed by a user may be sleeping that may result in motion data indicating little or no motion. The activity inference module 220 may infer from the motion data the activity of "sedentary." The activity of "sedentary" may additionally include other physical actions performed by the user such as sitting, napping, or standing, for example. Alternatively, the activity inference module 220 may infer from the motion data the activity of "sleeping." The activity of "sleeping" may be more specific than the activity of "sedentary."

In some embodiments, the activity inference module 220 may include a capacity to download or update patterns, templates, and/or programs. Additionally or alternatively, the activity inference module may include a capacity to learn or customize the patterns, templates, and/or programs to a user.

The activity inferred by the activity inference module 220 and the GPS signal quality and/or the Wi-Fi signal quality evaluated at the signal evaluation module 218 may be communicated to the heuristic solution module 222 as depicted by communication couplings 238 and 234. At the heuristic solution module 222, the processor 206 may apply a set of heuristics to the activity, the GPS signal quality, and/or the Wi-Fi signal quality. The set of heuristics may include static and/or dynamic heuristic models. For example, the set of heuristics may include a rule-based heuristics, a learning/adaptive heuristics program, and/or a heuristics program including predictive models with feedback which may modify or add to the heuristics program. Based on the activity, GPS signal quality, and/or the Wi-Fi signal quality; a control module 244 may alter the operational mode of the GPS module 208 and/or the Wi-Fi module 210 from a first operational mode to a second operational mode as indicated by communication couplings 240 and 242.

In some embodiments, the activity, the GPS signal quality, and/or the Wi-Fi signal quality may be continually and/or periodically updated with a second activity, a subsequent GPS signal quality, and/or a subsequent Wi-Fi signal quality. The control module 244 may further alter the operational modes of the GPS module 208 and/or the Wi-Fi module 210 based on the second activity, the subsequent GPS signal quality, and/or the subsequent Wi-Fi signal quality.

In some embodiments, the alterations to the operational modes of the GPS module 208 and/or the Wi-Fi module 210 may be based on variations between a first activity and a second activity, variations in the GPS signal quality, and/or variations in the Wi-Fi signal quality.

In some embodiments, the alterations to the operational modes of the GPS module 208 and/or the Wi-Fi module 210 may be based on defaults settings of the mobile device 202; programs, settings, and/or applications included in the mobile device 202; and/or user inputs.

In FIG. 2, the signal evaluation module 218, the activity inference module 220, the control module 244, and the heuristic solution module 220 are depicted as a separate modules within the processor 206. While the processor 206 may include the signal evaluation module 218, the activity inference module 220, the control module 244, and the heuristic solution module 220 as separate modules, this depiction is not limiting. In alternative embodiments, the signal evaluation module 218, the activity inference module 220, the control module 244, and/or the heuristic solution module 220 may be software applications performed by the processor 206, separate modules not included in the processor 206, and/or some combination thereof.

Figure 3:
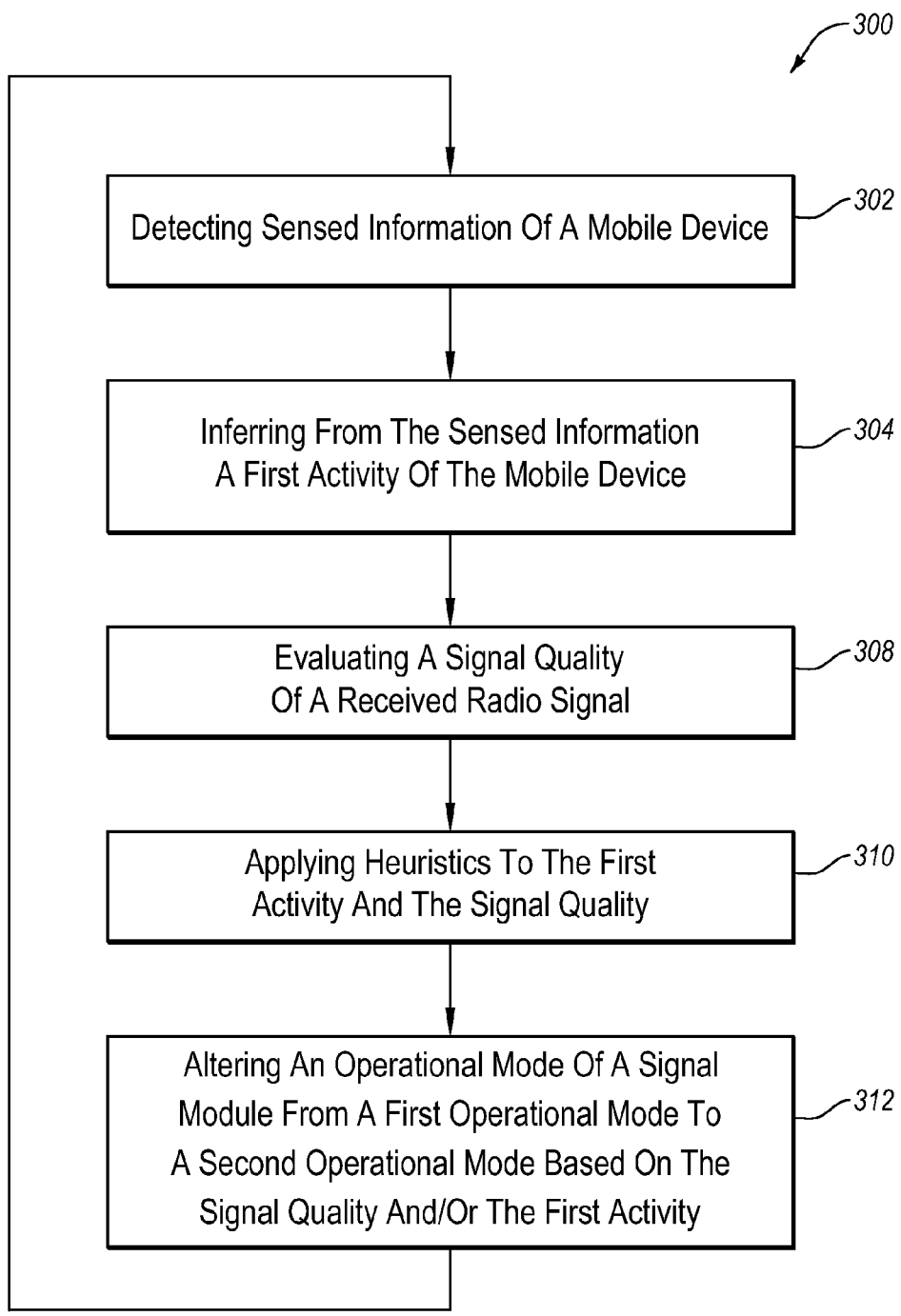
FIG. 3 is a flow chart of an example method, according to some embodiments.

FIG. 3 is a flow chart of an example method 300, according to some embodiments. The method 300 may be performed, for example, by the system 100, or more particularly, by the mobile device 102 described with respect with FIG. 1. The flow charts described herein do not necessarily imply a fixed order to the actions, and embodiments may be performed in any order that is practicable. Note that any of the methods described herein may be performed by hardware, software (including microcode), or a combination of hardware and software. For example, a storage medium may store thereon instructions that when executed by a machine result in performance according to any of the embodiments described herein.

At 302, motion of a mobile device is detected. Motion may be detected by one or more sensors included in the mobile device. The one or more sensors may include an accelerometer, a gyroscope, a camera, a light sensor, an infrared detector, a motion sensor, a barometer, and/or a compass, for example, which may detect motion.

In some embodiments, the sensor may generate motion data from the detected motion. The motion may be time-series data, that is, the motion may be detected or motion data may be generated as a function of time.

At 304, a first activity of a user of the mobile device is inferred from the motion. The inference may be based on a set or series of patterns, templates, and/or programs relating motion data generated by the sensor to a first activity.

In some embodiments, the first activity may include sedentary, walking, moving, running, and/or driving, for example. The first activity may be a general category that may indicate multiple, similar physical actions performed by a user and/or the first activity may specifically indicate the physical action performed by the user of the mobile device.

At 308, a signal quality of a received radio signal is evaluated. The signal quality may relate to the quality, intensity, and/or contents, for example, of the received radio signal. The signal quality may include one or more signal qualities if, for instance, the received radio signal includes one or more radio signals. Specifically, in some embodiments in which the received radio signal includes a received GPS signal and a received Wi-Fi signal, the signal quality may include at least a GPS signal quality and a Wi-Fi signal quality.

At 310, rule-based heuristics are applied to the first activity and the signal quality. The rule-based heuristics may compare, contrast, correlate, weigh, balance, process, or otherwise analyze the first activity and the signal quality. Some examples are discussed below with respect to FIG. 4A thru FIG. 4E.

In some embodiments, the rule-based heuristics may include thresholds. For example, the threshold may be incorporated in the rule-based heuristics to analyze the first activity and/or the signal quality. The thresholds may be predetermined or may change and/or customize to the user.

Example thresholds may include, but are not limited to, a signal threshold and/or a temporal threshold. In some embodiments, the signal quality may be analyzed as greater than or less than the signal threshold. Additionally or alternatively, the signal quality and/or the activity may be analyzed against the temporal threshold. That is, in some embodiments, a duration of a particular signal quality or activity may be analyzed in relation to a temporal threshold. That is, in some embodiments, a duration of a particular signal quality or an activity may have to be greater than a temporal threshold for the operational mode to be altered. For example, an activity such as driving may have to be inferred for at least 10 seconds prior to the operational mode of a signal module to be altered.

At 312, an operational mode of a signal module is altered from a first operational mode to a second operational mode based on the signal quality and/or the first activity. In some embodiments, the operational mode may be altered based on the rule-based heuristics discussed above and/or another set of inputs such as input from a user of the mobile device and/or default settings of the mobile device along with the first activity and/or the signal quality.

In some embodiments, the operational modes may include, but are not limited to, an active operational mode, one or more low power mode in which the signal module ceases continuous reception of and/or searching for the radio signal, a trickle mode which may limits the radio signal to an indication of the availability of the radio signal, and/or a powered off mode in which the mobile device ceases to direct power to the signal module.

In some embodiments, the method 300 may be repeated. For example, after having performed one or more of the acts 302, 304, 308, 310, 312, and altered an operational mode of the signal module, the method 300 may start again. In these and other embodiments, at 302, subsequent motion of the mobile device may be detected. The subsequent motion may be detected by the sensor and/or additional sensors individually and/or in combination with the sensor. At 304, a second activity of the user of the mobile device may be inferred from subsequent motion.

At 308, a subsequent signal quality of a subsequently received radio signal may be evaluated. The subsequent signal quality may relate to the quality, intensity, and/or contents, for example, of the subsequently received radio signal. The subsequent signal quality may include one or more subsequent signal qualities if, for instance, the subsequently received radio signal includes one or more radio signals. For example, in some embodiments, the subsequently received radio signals may include GPS signals and Wi-Fi signals and the subsequent signal quality may include at least a subsequent GPS signal quality and a subsequent Wi-Fi signal quality.

At 310, rule-based heuristics are applied to the second activity and/or the subsequent signal quality. The rule base heuristics applied to the second activity and/or the subsequent signal quality may be identical to, some modification of, and/or some subset of the rule-based heuristics applied to the first activity and/or the signal quality. At 312, the operational mode of the signal module is further altered from the second operational mode to the first operational mode based on the second activity and/or the subsequent signal quality.

FIGS. 4A thru 4E are flow charts of example methods 400A, 400B, 400C, 400D, and 400E, according to some embodiments. The methods 400A, 400B, 400C, 400D, and 400E may be performed, for example, by the system 100 or more particularly, by the mobile device 102, described with respect with FIG. 1. Each of methods 400A, 400B, 400C, 400D, and 400E are described separately herein, however, in some embodiments, a system may perform any one or any combination of methods 400A, 400B, 400C, 400D, and 400E.

Figure 4A:
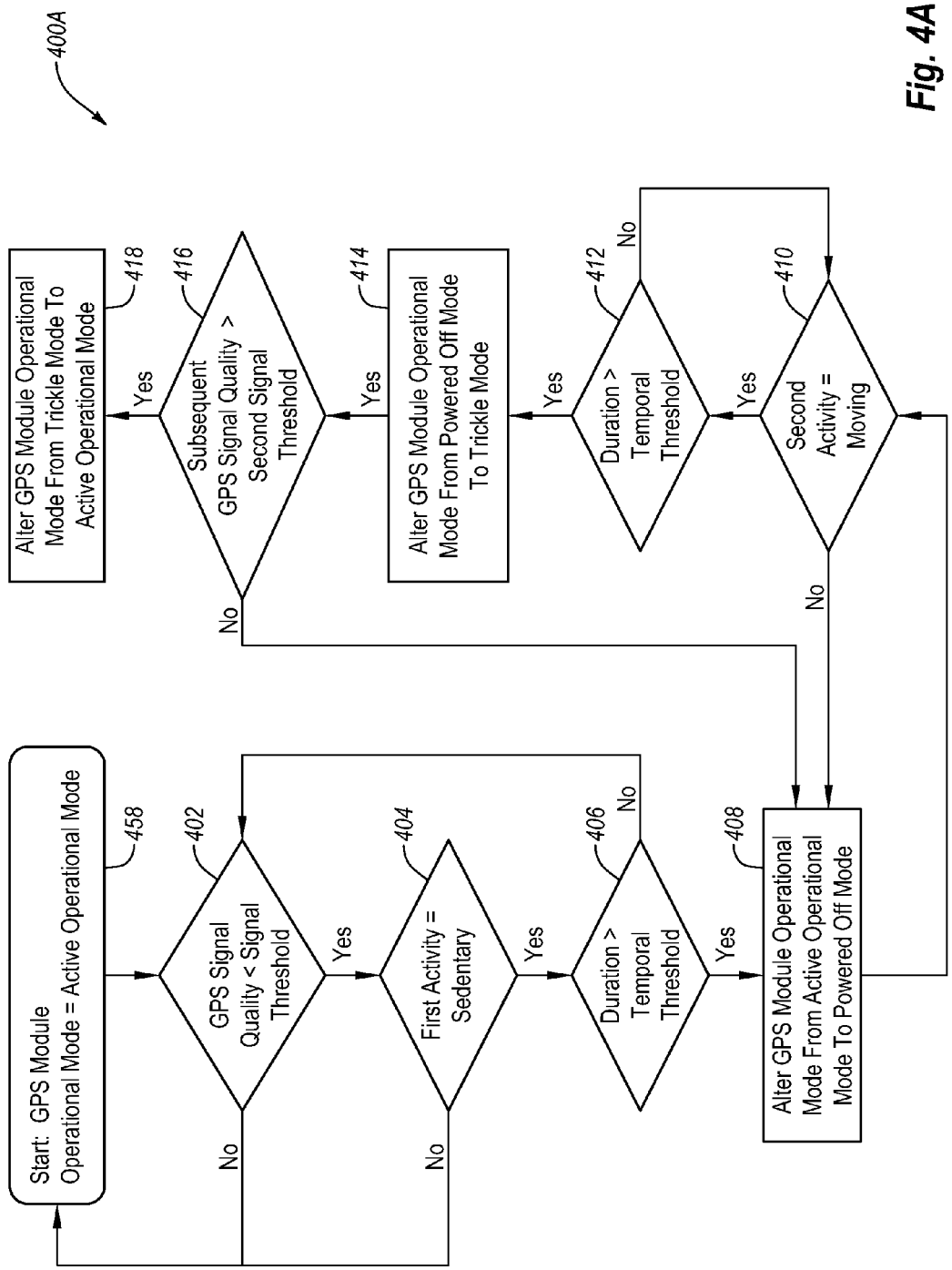
FIG. 4A is a flow chart of another example method, according to some embodiments.

FIG. 4A is a flow chart of another example method 400A, according to some embodiments. In the method 400A, the alteration of the operational modes of the signal module may be based on variations in the signal quality and variations between a first activity and a second activity. For simplicity, a specific example is depicted in FIG. 4A. However, similar methods may exist for alternative embodiments as described herein.

At 458, the method 400A starts with the GPS module at an operational mode equal to an active operational mode. At 402, the system may determine whether the GPS signal quality is less than a signal threshold. If the GPS signal quality not less than the signal threshold, the operational mode of the GPS module may not be altered. If however, the GPS signal quality is less than the signal threshold, the method 400A may continue to 404.

At 404, the system may determine whether the first activity is equal to sedentary. If the first activity is not sedentary, the operational mode of the GPS module may not be altered. If however, the first activity is equal to sedentary, the method 400A may continue to 406.

At 406, the system may determine a duration the first activity is equal to sedentary and a duration the GPS signal quality is less than a signal threshold. The system may further determine whether the durations are greater than a temporal threshold. If the durations are less than the temporal threshold, the system may return to 402 and may monitor until the durations are greater than the temporal threshold. If however, the durations are greater than the temporal threshold, the method 400A may continue to 408.

At 408, the operational mode of the GPS module may be altered from the active operational mode to the powered off mode. The method 400A may continue to 410.

At 410, the system may determine whether the second activity is equal to moving. If the second activity is not moving, the operational mode of the GPS module may not be altered. That is, the GPS module may remain powered off. If however, the second activity is equal to moving, the method 400A may continue to 412.

At 412, the system may determine a duration the second activity is equal to moving. The system may further determine whether the duration is greater than a temporal threshold. If the duration is less than the temporal threshold, the method 400A may return to 410 and may monitor until the duration is greater than the temporal threshold. If however, the duration is greater than the temporal threshold, the method 400A may continue to 414.

At 414, the operational mode of the GPS module may be altered from the powered off mode to the trickle mode. The method 400A may continue to 416.

At 416, the system may determine whether a subsequent GPS signal quality is greater than a second signal threshold. In some embodiments, the second signal threshold may be equal to the signal threshold of 402. If the subsequent GPS signal quality is greater than a second signal threshold, the operational mode of the GPS module may be altered from the trickle mode to the active operational mode. If however, the subsequent GPS signal quality is less than the second signal threshold, the operational mode of the GPS module may be altered from the trickle mode to the powered off mode and the method 400A may continue to 408.

FIG. 4B is a flow chart of another example method 400B according to some embodiments. In the method 400B, the alteration of the operational modes of the signal module may be based on variations between a first activity and a second activity. For simplicity, a specific example is depicted in FIG. 4B. However, similar methods may exist for alternative embodiments as described herein.

At 420, the method 400B starts with a Wi-Fi module at an operational mode equal to a powered off mode. That is, a mobile device ceases to direct power to the Wi-Fi module. The method 400B may continue to 422.

At 422, the system may determine whether a first activity is equal to walking. If the first activity is not equal to walking, the operational mode of the Wi-Fi module may not be altered. That is, the Wi-Fi module may remain powered off. If however, the first activity is equal to walking, the method 400B may continue to 424.

At 424, the system may determine whether the second activity is equal to sedentary. If the second activity is not equal to sedentary, the operational mode of the Wi-Fi module may not be altered. That is, the Wi-Fi module may remain powered off. If however, the second activity is equal to sedentary, the method 400B may continue to 426.

At 426, the operational mode of the Wi-Fi module may altered from the powered off mode to an active operational mode.

The method 400B may indicate, for example, that the physical actions performed by a user may include walking to a user's house and arriving at the user's home. In this circumstance, there may be one or more APs present from which Wi-Fi signals may be received by the Wi-Fi module.

FIG. 4C is a flow chart of another example method 400C according to some embodiments. In the method 400C, the alteration of the operational modes of the signal module may be based on a first activity for a duration. For simplicity, a specific example is depicted in FIG. 4C. However, similar methods may exist for alternative embodiments as described herein.

At 428, the method 400C starts with the Wi-Fi module at an operational mode equal to an active operational mode. The method 400C may continue to 430.

At 430, the system may determine whether the first activity is equal to driving. If the first activity is not equal to driving, the operational mode of the Wi-Fi module may not be altered. If however, the first activity is equal to driving, the method 400C may continue to 432.

At 432, the system may determine a duration the first activity is equal to driving. The system may further determine whether the duration is greater than a temporal threshold. If the duration is less than the temporal threshold, the system may return to 430 and may monitor until the duration is greater than the temporal threshold. If however, the duration is greater than the temporal threshold, the method 400C may continue to 434.

At 434, the operational mode of the Wi-Fi module may be altered from the active operational mode to the powered off mode.

The method 400C may indicate, for example, that the physical actions performed by a user may include driving. In this circumstance, Wi-Fi signals may be unavailable or it may be impractical to utilize any available Wi-Fi signals received by a Wi-Fi module.

Figure 4D:
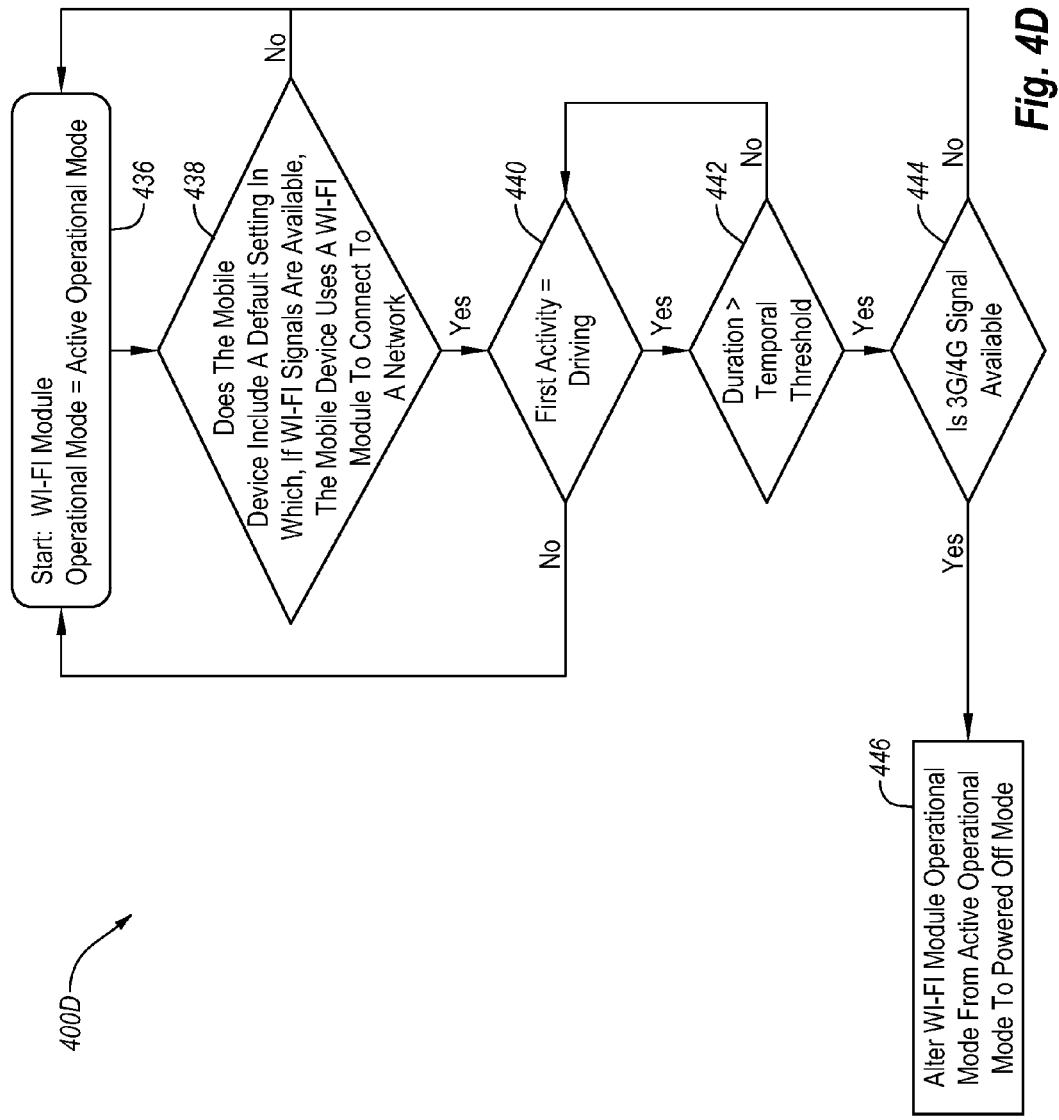
FIG. 4D is a flow chart of another example method, according to some embodiments.

FIG. 4D is a flow chart of another example method 400D according to some embodiments. In the method 400D, the alteration of the operational modes of the signal module may be based on a mobile device default, a first activity, a first activity duration, and availability of another signal. For simplicity, a specific example is depicted in FIG. 4D. However, similar methods may exist for some alternative embodiments as described herein.

At 436, the method 400D starts with a Wi-Fi module at an operational mode equal to an active operational mode. The method 400D may continue to 438.

At 438, the system may determine whether the mobile device includes a default setting in which, if Wi-Fi signals are available, the mobile device uses a Wi-Fi module to connect to a network. If the mobile device does not include the default setting, the operational mode of the Wi-Fi module may not be altered. If the mobile device includes the default setting, the method 400D may continue to 440.

At 440, the system may determine whether the first activity is equal to driving. If the first activity is not equal to driving, the operational mode of the Wi-Fi module may not be altered. If, however, the first activity is equal to driving, the method 400D may continue to 442.

At 442, the system may determine a duration the first activity is equal to driving. The system may further determine whether the duration is greater than a temporal threshold. If the duration is less than the temporal threshold, the system may return to 440 and may monitor until the duration is greater than the temporal threshold. If however, the duration is greater than the temporal threshold, the method 400D may continue to 444.

At 444, the system may determine whether a 3G/4G signal is available. If the 3G/4G signal is not available, the operational mode of the Wi-Fi module may not be altered. If however, the 3G/4G signal is available, the method 400D may continue to 446.

At 446, the operational mode of the Wi-Fi module may be altered from the active operational mode to the powered off mode.

FIG. 4E is a flow chart of another example method 400E according to some embodiments. In the method 400E, the alteration of the operational modes of the signal module may be based on: applications included on a mobile device; capabilities of the applications; availability of radio signals including, for example, GPS signals and/or Wi-Fi signals; and user input. For simplicity, a specific example is depicted in FIG. 4E. However, similar methods may exist for alternative embodiments as described herein.

At 448, the method 400E starts with a Wi-Fi module and a GPS module at an operational mode equal to an active operational mode. The method 400E may continue to 450.

At 450, the system may determine whether applications included on the mobile device are capable of determining the location of the mobile device based on Wi-Fi signals ("network-based locations"). If the applications on the mobile device are not capable of determining network-based locations, the operational modes of the GPS module and/or the Wi-Fi module may not be altered. If, however, the applications on the mobile device are capable of determining network-based locations, the method 400E may continue to 452.

At 452, the operational mode of the GPS module may be altered from the active operational mode to the powered off mode. The method may continue to 454.

At 454, the system may determine whether a user requested a navigation application that may be operated with GPS signals rather networked-based locations. If the user of the mobile device has not requested the navigation application, the operational mode of the GPS module may not be altered. That is, the GPS module may remain powered off. If however, the user of the mobile device requested the navigation application, the method may continue to 456.

At 456, the operational mode of the GPS module may be altered from the powered off mode to the active operational mode.

In some embodiments, the methods 400A, 400B, 400C, 400D, and/or 400E or some portion thereof may be performed sequentially. By way of example and not limitation, referring to FIG. 4A, at 418, the operational mode of the GPS module is the active operational mode. The system performing method 400A may then, for example, perform method 400A again or may perform the method 400C depicted in FIG. 4C, the method 400D depicted in FIG. 4D, or the method 400E depicted in FIG. 4E.

Likewise, referring to FIG. 4E, at 456 the operational mode of the GPS module is the active operational mode. The system performing method 400E may then, for example perform method 400E again, or may perform method the method 400A depicted in FIG. 4A, the method 400D depicted in FIG. 4D, or the method 400C depicted in FIG. 4C.

Likewise still, referring to FIG. 4E, at 452, and referring to FIG. 4C, at 434, the operational mode of the GPS module is the powered off mode. The system performing method 400E or 400C may then, for example perform method 400B depicted in FIG. 4B.

Although particular system, hardware, and interface configurations have been described herein, embodiments may be performed with any other types of system, hardware, and/or interface configurations. Similarly, although specific methods have been described, any number of other types of methods might be performed in connection with embodiments described here.

The several embodiments described herein are solely for the purpose of illustration. Persons skilled in the art will recognize from this description that other embodiments may be practiced with modifications and alterations limited only by the claims.

What is claimed is:

1. A non-transitory computer-readable storage medium having stored thereon instructions that when executed by a machine result in the following:
   detecting motion of a mobile device;
   inferring from the motion a first activity of a user of the mobile device;
   evaluating a signal quality of a radio signal received by a signal module;
   altering an operational mode of the signal module from a first operational mode to a second operational mode based on the signal quality and the first activity;
   evaluating a subsequent signal quality of a subsequent radio signal received by the signal module;
   further altering the operational mode of the signal module from the second operational mode to a third operational mode based on the subsequent signal quality; and
   evaluating whether the signal quality of the radio signal exceeds a first signal quality threshold and whether the subsequent signal quality of the subsequent radio signal exceeds a second signal quality threshold.

2. The medium of claim 1, wherein execution of the instructions further results in:
   detecting subsequent motion of the mobile device;
   inferring from the subsequent motion a second activity of the user of the mobile device; and
   further altering the operational mode of the signal module from the second operational mode to a third operational mode based on the second activity.

3. The medium of claim 2, wherein further altering the operational mode of the signal module occurs when the second activity differs from the first activity.

4. The medium of claim 1, wherein altering the operational mode of the signal module includes applying rule-based heuristics to the first activity and the signal quality.

5. The medium of claim 1, wherein the received radio signal includes a Global Positioning System ("GPS") radio signal ("GPS signal") and the signal module includes a GPS module.

6. The medium of claim 5, wherein the second operational mode includes a trickle mode in which the GPS signal is limited to a number of one or more GPS satellites detected by the GPS module.

7. The medium of claim 1, wherein the received radio signal includes a Wireless Fidelity ("Wi-Fi") network radio signal ("Wi-Fi signal") and the signal module includes a Wi-Fi module.

8. The medium of claim 7, wherein the second operational mode includes a powered off mode when the first activity indicates the user is driving.

9. The medium of claim 1, wherein the motion is detected by a sensor included in the mobile device, wherein the sensor generates motion data.

10. The medium of claim 1, wherein:
    the first operational mode includes an active operational mode in which the signal module continuously receives and/or searches for the radio signal; and
    the second operational mode includes a low power mode in which the signal module ceases continuous reception of and/or searching for the radio signal.

11. The medium of claim 1, wherein the first activity includes sedentary, walking, running, moving, and/or driving.

12. The medium of claim 1, wherein altering the operational mode of the signal module occurs when the signal quality of the radio signal is less than the first signal quality threshold; and further altering the operational mode of the signal module occurs when the subsequent signal quality of the subsequent radio signal exceeds the second signal quality threshold.

13. A storage medium having stored thereon instructions that when executed by a machine results in performance of the method of claim 1.

14. A system, comprising:
    a signal module associated with two or more operational modes and configured to receive radio signals;
    a sensor configured to detect motion and generate motion data; and
    a processor coupled to the sensor and the signal module, the processor configured to:
    infer an activity from the motion data, evaluate a signal quality of the radio signals,
    alter an operational mode of the signal module based on the signal quality and the activity;
    evaluate a subsequent signal quality of a subsequent radio signal received by the signal module;
    further altering the operational mode of the signal based on the subsequent signal quality; and
    evaluating whether the signal quality of the radio signal exceeds a first signal quality threshold and whether the subsequent signal quality of the subsequent radio signal exceeds a second signal quality threshold.

15. The system of claim 14 wherein the processor is further configured to apply a rule-based heuristic to the signal quality and the activity.

16. The system of claim 14, wherein the signal module is a GPS module configured to receive GPS signals.

17. The system of claim 16, further comprising:
    a Wi-Fi signal module including two or more Wi-Fi module operational modes and configured to receive Wi-Fi signals; wherein
    the processor is further coupled to the Wi-Fi signal module and is further configured to:
    evaluate a Wi-Fi signal quality of the Wi-Fi signals; and
    alter a Wi-Fi module operational mode of the Wi-Fi signal module based on the Wi-Fi signal quality and the activity.

18. The system of claim 14, wherein the signal module is a Wi-Fi module configured to receive Wi-Fi signals.

19. The system of claim 14, wherein the operational modes include a low power operational mode and an active operational mode.

20. The system of claim 19, wherein in the low power operation mode is a powered off mode.

21. The system of claim 19, wherein the activity to be inferred by the processor indicates a physical action performed by a user of a mobile device.

22. A method, comprising:
   detecting motion of a mobile device;
   inferring from the motion a first activity of a user of the mobile device;
   evaluating a signal quality of a radio signal received by a signal module;
   altering an operational mode of the signal module from a first operational mode to a second operational mode based on the signal quality and the first activity;
   evaluating a subsequent signal quality of a subsequent radio signal received by the signal module;
   further altering the operational mode of the signal module from the second operational mode to a third operational mode based on the subsequent signal quality; and
   evaluating whether the signal quality of the radio signal exceeds a first signal quality threshold and whether the subsequent signal quality of the subsequent radio signal exceeds a second signal quality threshold.

23. The method of claim 22, wherein execution of the instructions further results in:
   detecting subsequent motion of the mobile device;
   inferring from the subsequent motion a second activity of the user of the mobile device; and
   further altering the operational mode of the signal module from the second operational mode to a third operational mode based on the second activity.

24. The method of claim 22, wherein altering the operational mode of the signal module includes applying rule-based heuristics to the first activity and the signal quality.

\* \* \* \* \*